UNITED STATES PATENT OFFICE.

JULIUS ABEL AND FRITZ KALKOW, OF LUDWIGSHAFEN, GERMANY, ASSIGNORS TO THE BADISCHE ANILIN AND SODA FABRIK, OF SAME PLACE.

BROWN SULFUR DYE.

SPECIFICATION forming part of Letters Patent No. 650,292, dated May 22, 1900.

Application filed March 13, 1900. Serial No. 8,472. (No specimens.)

*To all whom it may concern:*

Be it known that we, JULIUS ABEL, doctor of philosophy, a citizen of the free Hansa town of Hamburg, and FRITZ KALKOW, doctor of philosophy, a subject of the King of Prussia, Emperor of Germany, both residing at Ludwigshafen-on-the-Rhine, in the Kingdom of Bavaria and Empire of Germany, have invented new and useful Improvements in Brown Coloring-Matters, of which the following is a specification.

Our invention relates to the production of a new brown dyestuff directly dyeing cotton, which can be obtained by treating a certain diphenylamin derivative with sulfur and sodium sulfid. The diphenylamin derivative used can be prepared by condensing together para-amido-ortho-nitrophenolsulfoacid (which may be obtained by the action of nitric acid on para-amido-phenolsulfoacid) with meta-dinitro-chlorbenzene in the presence of suitable agents for binding hydrochloric acid, such as carbonate of soda or sodium acetate. Judging from the method of its formation this body has the constitution represented by the formula

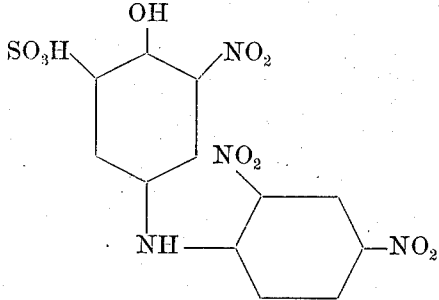

and is para-hydroxy-tri-nitro-diphenylamin-meta-sulfoacid. On heating it with sulfur and sodium sulfid a dyestuff is formed which possesses great affinity for cotton fiber, dyeing it in brown maroon-like shades, which on treatment with copper sulfate in an acetic-acid bath turns to dark brown. Both the original and coppered colorations are exceedingly fast. Slight variations in the shade of our new coloring-matter are observable, according to the quantity of sulfur and sodium sulfid used in the melt.

The following example illustrates the nature of our invention and the manner of carrying the same into practical effect. The parts are by weight:

Slowly heat thirty (30) parts of the condensation product from para-amido-ortho-nitro-phenol-ortho-sulfoacid and meta-dinitro-chlorbenzene with sixty (60) parts of sulfur and one hundred and fifty (150) parts of crystallized sodium sulfid in an iron vessel provided with a stirrer to 140° centigrade. Maintain at this temperature until the mass has become solid and easy to powder. After grinding up it can be directly employed for dyeing.

Our new dyestuff forms a dark powder easily soluble in water with a violet-brown color, which solution dyes cotton in brown shades that become dark brown on treatment with copper-sulfate solution acidified with acetic acid.

Common salt throws down a precipitate from the aqueous solution of our new dyestuff, while the addition of ammonium chlorid or hydrochloric acid produces a brown flocculent precipitate.

Now what we claim is—

As a new product the dyestuff which can be obtained by treating para-hydroxy-tri-nitro-diphenylamin-meta-sulfoacid with sulfur and sodium sulfid, which is a dark powder soluble in water with a violet-brown color and dyes unmordanted cotton in brown shades which on treatment with a solution of copper sulfate acidified with acetic acid become dark brown, and which is precipitated from its aqueous solution by the addition of hydrochloric acid as a brown flocculent precipitate, substantially as described.

In testimony whereof we have hereunto set our hands in the presence of two subscribing witnesses.

JULIUS ABEL.
FRITZ KALKOW.

Witnesses:
F. F. NESSELER,
J. L. HEINKE.